United States Patent [19]

Larimer et al.

[11] Patent Number: 4,932,908

[45] Date of Patent: Jun. 12, 1990

[54] ENERGY EFFICIENT ASYMMETRIC PRE-SWIRL VANE AND TWISTED PROPELLER PROPULSION SYSTEM

[75] Inventors: Gary E. Larimer, Sterling, Va.; Donald H. VanLiew, Severna Park, Md.

[73] Assignee: United States of America, Washington, D.C.

[21] Appl. No.: 163,578

[22] Filed: Mar. 3, 1988

[51] Int. Cl.$^5$ .............................................. B63H 5/06
[52] U.S. Cl. .......................................... 440/66; 440/82
[58] Field of Search ...................... 114/57; 440/66, 67, 440/68, 69, 70, 82

[56] References Cited

U.S. PATENT DOCUMENTS

| | | | |
|---|---|---|---|
| 576,169 | 2/1897 | Stead | 416/223 |
| 768,336 | 8/1904 | Manker | 440/70 |
| 832,173 | 10/1906 | Taylor | 416/223 |
| 1,019,436 | 3/1912 | Draper | 416/223 |
| 1,491,493 | 4/1924 | Pinkert | 416/223 |
| 1,549,564 | 8/1925 | Slocum | 440/66 |
| 2,258,399 | 10/1941 | Witteman | 440/66 |
| 2,974,628 | 3/1961 | Erlbacher | 440/82 |
| 4,631,036 | 12/1986 | Grothues-Spork | 440/66 |
| 4,798,547 | 1/1989 | Gearhart | 440/66 |

FOREIGN PATENT DOCUMENTS

| | | | |
|---|---|---|---|
| 26087 | 2/1982 | Japan | 114/57 |
| 128994 | 8/1983 | Japan | 440/66 |
| 520984 | 5/1940 | United Kingdom | 440/67 |
| 2177365 | 1/1987 | United Kingdom | 440/66 |

Primary Examiner—Sherman D. Basinger
Assistant Examiner—Thomas J. Brahan
Attorney, Agent, or Firm—O. M. Wildensteiner

[57] ABSTRACT

An asymmetric set of pre-swirl vanes (stators) and a specially matched propeller for use on an inclined shaft. The propulsor is designed by considering the mutual interaction of the propeller on the vanes and the vanes on the propeller. The propulsor unit provides the following:

1. increased propulsive efficiency due to the reduced rotational (swirl) and axial kinetic energy losses in the propulsor's slipstream;
2. reduction or elimination of propeller cavitation;
3. reduction or elimination of unsteady propulsor forces as well as propulsor-induced hull vibrations.

A unique feature of the present invention is that a prior art flat faced commercially available propeller can be modified to match the vane flow field for optimum propulsor performance. The use of commercially available propellers reduces the installation or hardware cost significantly and allows the propeller to be repaired easily if damaged.

Another unique feature is that the vanes operate well with an unmodified commercially available prior art flat faced, optimum constant pitch propeller, and that the propeller as modified for use with the vanes also performs exceptionally well without the vanes. The modified propeller without vanes in fact outperformed the prior art flat faced optimum constant pitch propeller used on the 41 foot test craft.

4 Claims, 11 Drawing Sheets

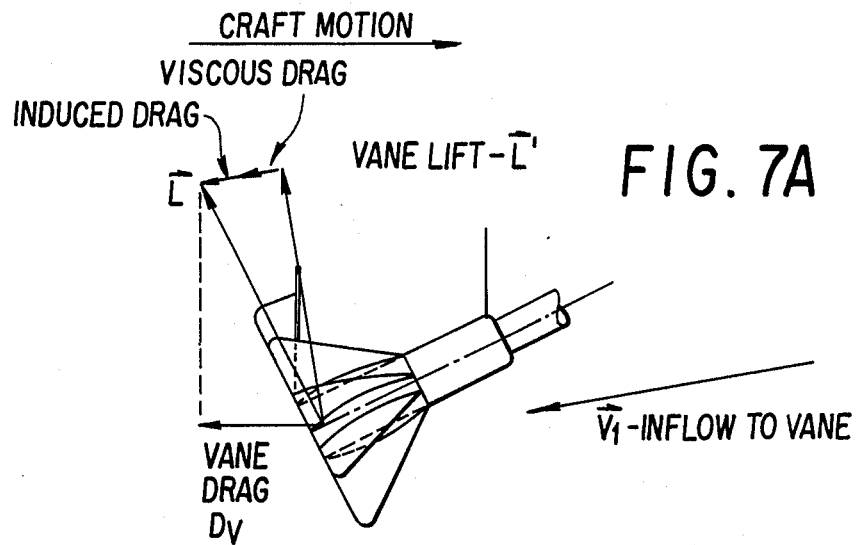
FIG. 7A
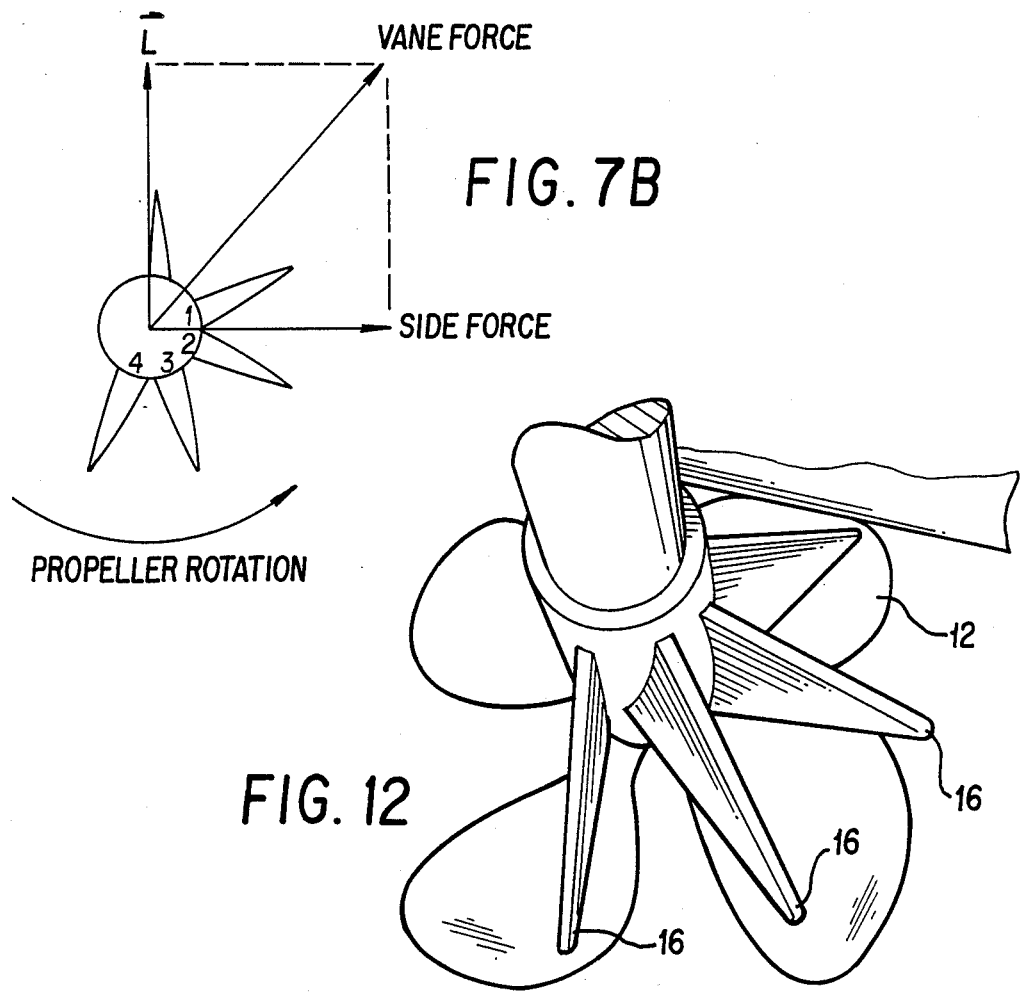
FIG. 7B
FIG. 12

TABLE III
COORDINATES FOR TRIM TAB
OR FLAP
CHORD=3.562 INCHES

| % CHORD | $Y_{LOWER}$ | $Y_{INTERMEDIATE}$ | $Y_{UPPER}$ |
|---|---|---|---|
| 0 | 1.02 | — | — |
| 2.5 | 0.88 | — | 1.10 |
| 5.0 | 0.78 | — | 1.09 |
| 10.0 | 0.67 | — | 1.04 |
| 20.0 | 0.43 | — | 0.99 |
| 30.0 | 0.24 | — | 0.95 |
| 40.0 | 0.05 | — | 0.93 |
| 50.0 | −0.12 | — | 0.91 |
| 60.0 | −0.26 | — | 0.91 |
| 62.5 | −0.30 | 0.38 | 0.91 |
| 70.0 | 0.46 | — | 0.91 |
| 80.0 | 0.57 | — | 0.92 |
| 90.0 | 0.69 | — | 0.95 |
| 100.0 | 0.80 | — | 0.97 |

TRIM TAB OR FLAP

1

ENERGY EFFICIENT ASYMMETRIC PRE-SWIRL VANE AND TWISTED PROPELLER PROPULSION SYSTEM

STATEMENT OF GOVERNMENT INTEREST

The present invention may be used by or on behalf of the Government of the United States without the payment of any royalties thereon or therefor.

BACKGROUND

The prior art has recognized that improvements in efficiency could be obtained from properly directing the flow of water into a propeller. Previous systems had vane (stator)-propeller combinations in which the vanes were located either forward of the propeller (pre-swirl), or aft of the propeller (post-swirl). These systems have one or more of the following in common:

1. the vanes are mounted axisymmetrically, and are designed for the case in which the flow is perpendicular to the propeller disc.
2. The vanes are designed to work in the viscous boundary layer of the ship; in this respect the vanes are operating as a flow directing device only.
3. A specially designed propeller (not a modified commercially available off-the-shelf propeller) is used with either of the above vanes.

Recently, however, it has been recognized that in some cases the flow directing means should not be symmetrical since the flow into the propeller is not symmetrical. See, for example, Japanese patent application number 56-162006 (found in U.S. class 440 subclass 66) which shows a ship having a single propeller and which has a set of flow-directing vanes on only one side of its stern, the purpose of which is to create a wake stream flowing in the opposite direction to the turning direction of the propeller. The propeller shaft of the ship is horizontal; the flow distortion that the vanes are intended to overcome is caused by the boundary layer close to the hull.

Japanese patent application number 58-77998 (also found in U.S. class 440 subclass 66) shows a ship having dual propellers mounted on struts, one on each side of the stern. In this application the struts, which are asymmetrically arranged around the propeller disc, are contoured to provide water flow to the propeller with a rotary component opposite to the rotation of the screw propeller. However, in this application the propeller shafts are also horizontal with the flow distortion being caused by the shape of the stern of the vessel.

What the prior art has failed to recognize is that the flow into a propeller that is mounted on an inclined shaft is oblique and causes a once-per-revolution variation in propeller blade section angle of attack. The prior art also failed to recognize that the propeller on an outboard motor is also inclined to the water flow when the boat is moving.

OBJECTS OF THE INVENTION

Accordingly, it is an object of the present invention to provide a means of increasing the efficiency of a propeller mounted on an inclined shaft.

It is a further object of the present invention to provide such increased efficiency on a vessel having either a single propeller or multiple propellers.

2

It is a further object of the present invention to provide such increased efficiency regardless of the configuration of the vessel's bottom.

It is a further object of the present invention to provide such increased efficiency without the addition of moving parts to the propulsion system.

It is a further object of the present invention to provide such increased efficiency in an outboard motor.

It is a further object of the present invention to provide a means of increasing propeller loading while minimizing cavitation problems.

It is a further object of the present invention to provide such increased efficiency in an airplane propeller.

It is a further object of the present invention to provide a propeller guard for a vessel that does not result in a net loss in propulsion efficiency for the vessel.

BRIEF DESCRIPTION OF THE DRAWINGS

FIG. 7 shows the forces associated with asymmetric vanes on an inclined shaft.

FIG. 12 is a view from underneath the boat looking toward the stern.

SUMMARY

Briefly, the present invention comprises a set of asymmetric pre-swirl vanes and a matched propeller, the vanes being located asymmetrically around the propeller disc. Most of the vanes are located on the side of the disk where the propeller is on the upward part of its rotation. Increased propulsive efficiency results from the following:

(1) reduced axial and rotational kinetic energy losses in the slipstream of the propulsor;
(2) reduced viscous friction losses on the propeller blades;
(3) a more optimum loading on the propeller;
(4) a reduction in engine RPM which allows a marine diesel to operate in a more efficient area of its fuel map for a given craft speed;
(5) reduction or elimination of vessel drag associated with forces which result from having a propeller mounted on an inclined shaft.

The asymmetric pre-swirl vanes and matched propeller system of the present invention provide the following, either singly or in combination:

(1) increased propulsive efficiency;
(2) reduction in propulsor-induced hull or machinery vibrations;
(3) improved directional stability on single propeller vessels;
(4) counteraction of torque on single propeller vessels;
(5) reductions in propeller cavitation and cavitation damage;
(6) reduction in propeller diameter without losing original efficiency;
(7) protection from injury by the propeller to persons in the water without a net loss in propulsive efficiency due to drag of the protective device.

Although the vanes and modified propeller of the present invention were designed as a unit, it was unexpectedly found that each could operate independently of the other. That is, the vanes can operate with an unmodified prior art commercially available flat faced optimum constant pitch propeller to produce increased efficiency over the whole speed range of the craft. Further, such a propeller, when modified in accordance with the present invention, can produce efficiency gains when operating without the vanes of the present invention.

DESCRIPTION OF THE PREFERRED EMBODIMENT

Figure 4:
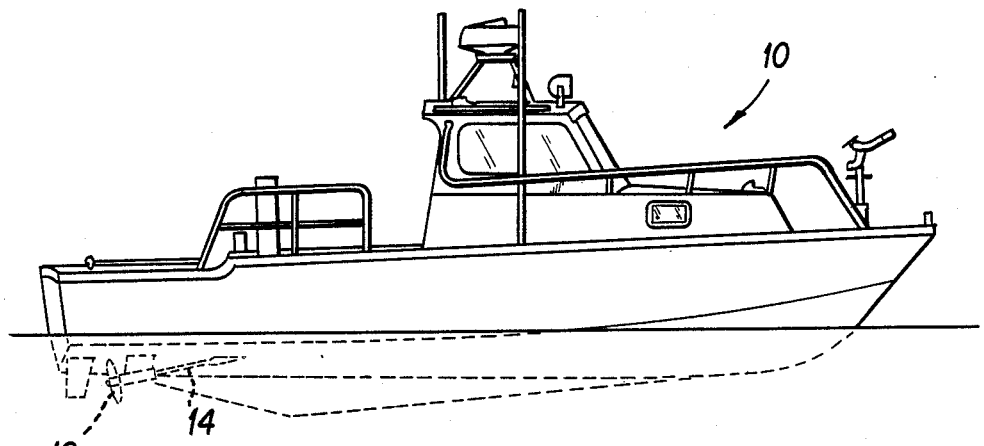
FIG. 4 is a side view of the 41 foot boat that was used in the development of the present invention showing the propeller on its inclined shaft.

FIG. 4 shows boat 10 for which the asymmetric vanes and matched propeller were developed. Boat 10 is a standard Coast Guard patrol boat of 41 feet overall length having twin propellers. As can be seen, propeller 12 is mounted on inclined shaft 14 which makes an angle of about 14 degrees with respect to the boat bottom (or "buttock lines"). Because of the angle of shaft 14 with respect to the bottom of boat 10, propeller 12 makes a corresponding angle of 14 degrees with the inflow of water, since the water flow is approximately parallel to the bottom of the boat.

Figure 5:
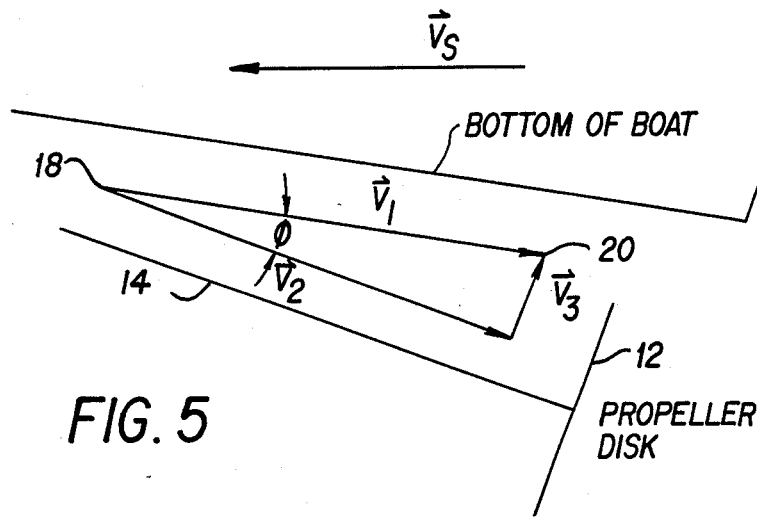
FIG. 5 shows the inflow velocities seen by the propeller disc.
Figure 5A:
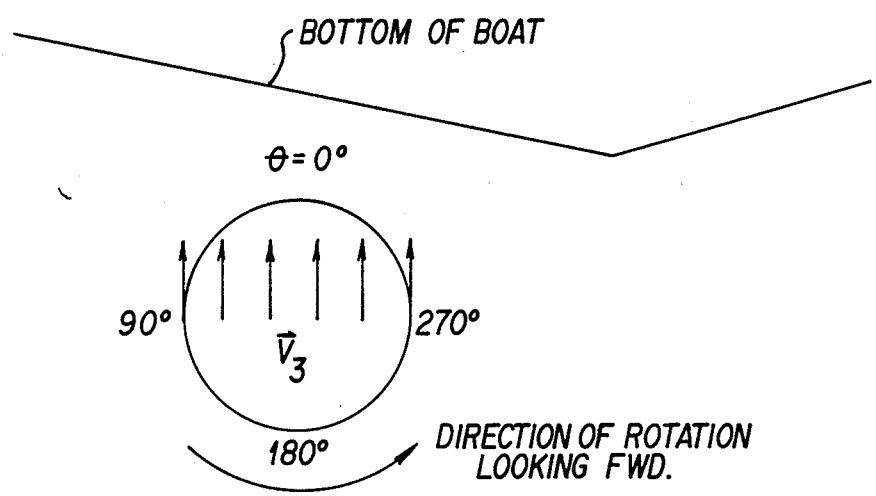
Figure 6:
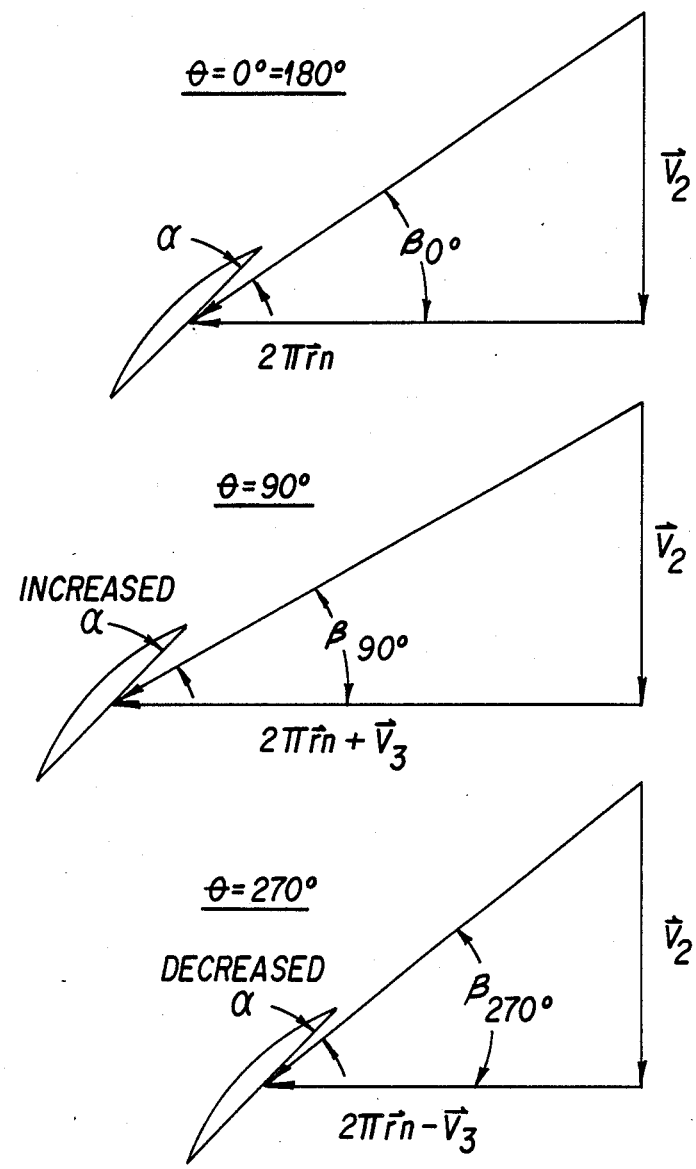
FIG. 6 shows the variation in blade section angle of attack as the propeller makes a complete revolution.

FIG. 5 shows a side view of the magnitudes and directions of water flow components in vector form "seen" by a propeller that does not have the vanes of the present invention. Velocity vector V1 represents the actual water flow parallel to the bottom of the boat. Velocity vector V2 represents the component of water flow parallel to propeller shaft 14. Since a given water molecule which starts at point 18 has to reach point 20 at the same time whether it follows path V1 or V2, this means that there must be a velocity component such as is represented by velocity vector V3 for the water that flows parallel to shaft 14. FIG. 5a shows the way that propeller 12 "sees" velocity vector V3; that is, the water approaching propeller 12 appears to have a uniform upward velocity equal to the magnitude of velocity vector V3. It should be noted that the water approaching propeller 12 is undisturbed by the stern of the vessel or any protuberances on the underside of the vessel. In this example the propeller is assumed to have a counterclockwise rotation; therefore, for the first half of the propeller's rotation (from 0 degrees to 180 degrees in FIG. 5a) this velocity is counter to the propeller's rotation, while it is in the direction of the propeller's rotation for the second half of the propeller's rotation. A propeller produces less thrust on the side where it is moving in the same direction as the water flow into it (i.e. the second half of the propeller's rotation in FIG. 5a) than on the side where it is moving in the opposite direction to the water flow into it (i.e. the first half of the propeller's rotation in FIG. 5a). This is because velocity vector V3 in FIG. 5 causes the blade section angle of attack to change periodically as the blade makes one revolution, as shown in FIG. 6. In this figure, a single blade section is shown at the 0, 90, 180, and 270 degree positions in the propeller disc. Velocity vector V2 is the same as in FIG. 5. The tangential velocity Vt of a blade section at radius r and moving at n revolutions per second is $Vt = 2\pi rn$. As can be seen, velocity V3 is added to and subtracted from Vt at 90 degrees and 270 degrees, respectively. This causes the blade advance angle, $\beta$, to change, which results in variations in the section angle of attack, which in turn causes changes in the loading of the propeller blade. Therefore, the loading of the propeller blade is greatest at 90 degrees and least at 270 degrees. For other locations on the propeller disc $\beta$ is given by the following formula:

$$\beta = \tan^{-1}[V2/(2\pi rn + V2\tan\phi\sin\phi)] \quad (1)$$

where
$\theta$ = angular position on propeller disc (see FIG. 4)
r = vector position of blade section
$\phi$ = angle between bottom of boat and shaft (see FIG. 5).

The variation in blade section angle of attack at any propeller radius, hence the loading, is approximately the difference between the advance angle, $\beta$, given in equation (1), and the pitch angle of the blade at that radius. This once-per-revolution variation in angle of attack gives rise to unsteady axial forces along the propeller shaft, and steady as well as unsteady forces which are perpendicular to the inclined shaft (see FIG. 3). When this perpendicular force is resolved into its horizontal and vertical components it can be seen that the horizontal component is in reality a drag force Dp acting on the craft. As shown below, the asymmetric pre-swirl vanes of the present invention minimize or eliminate this drag.

The drag of the vanes resolved parallel to craft motion, Dv, is composed of three components: (1) viscous drag; (2) induced drag; and (3) drag due to inclination of the flow relative to craft advance (see FIG. 7A). The viscous drag is composed of friction and eddy formation losses. Induced drag results from the trailing vortex system of the vanes. Finally, the asymmetry of the vanes results in a force which acts at an oblique angle to the shaft and at a right angle to the inflow and has a component of force directed aft. When all three drag components are resolved parallel to the direction of craft motion a net drag, Dv, results.

Figure 8:
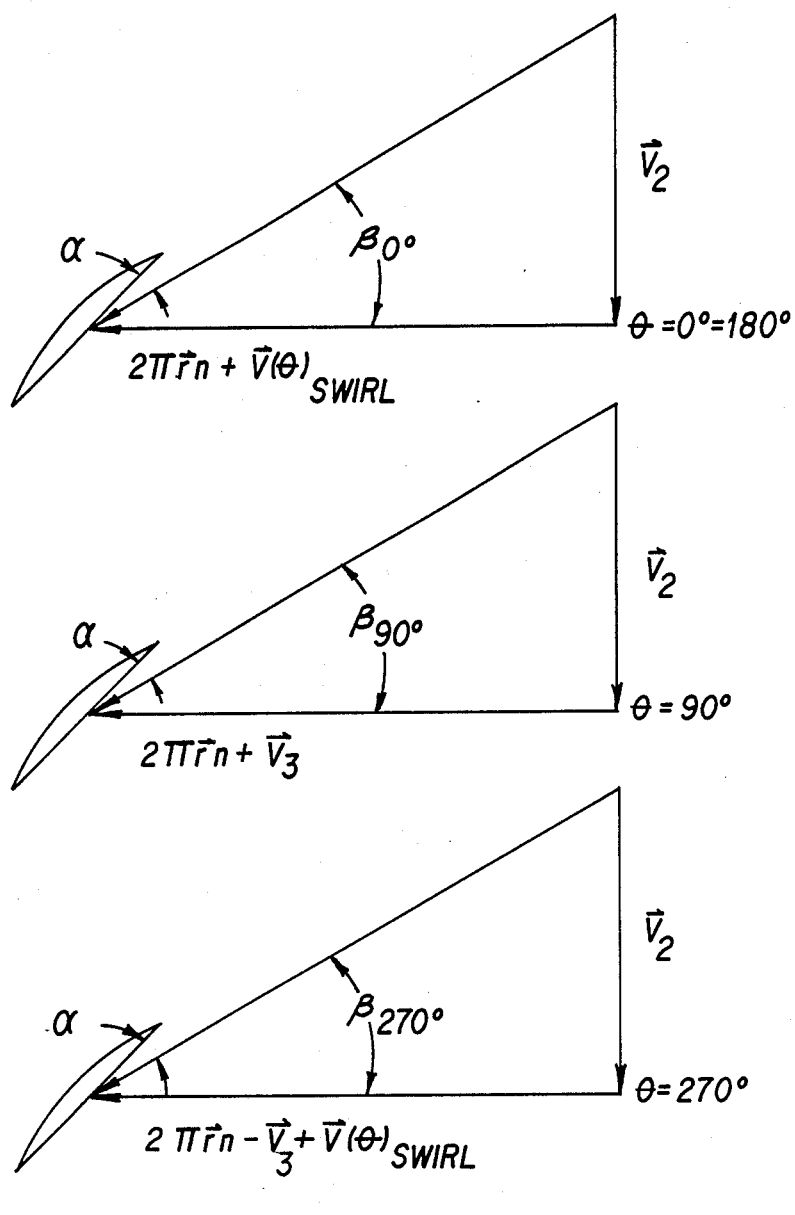
FIG. 8 shows how the vane-propeller system of the present invention reduces or eliminates variations in the blade advance angle $\beta$.

The rotational velocity field, $V(\theta)_{swirl}$, at the propeller disc, caused by the vanes, is shown in FIG. 8. The rotational or swirl velocities induced by the vanes have reduced or eliminated the cyclic variations in the advance angle $\beta$, and, therefore, have minimized or eliminated the perpendicular shaft force and its drag component Dp. The decrease in perpendicular force generated by the propeller is offset, either totally or partially, by the increase in the component of vane force which is perpendicular to the propeller shaft.

The reduction or elimination of variations in the advance angle also reduces the probability of face cavitation. In addition, the vanes tend to decrease the load on the more heavily loaded portion of the propeller disc, as will be discussed later. This also reduces the amount or likelihood of cavitation on the blade backs.

Figure 1:
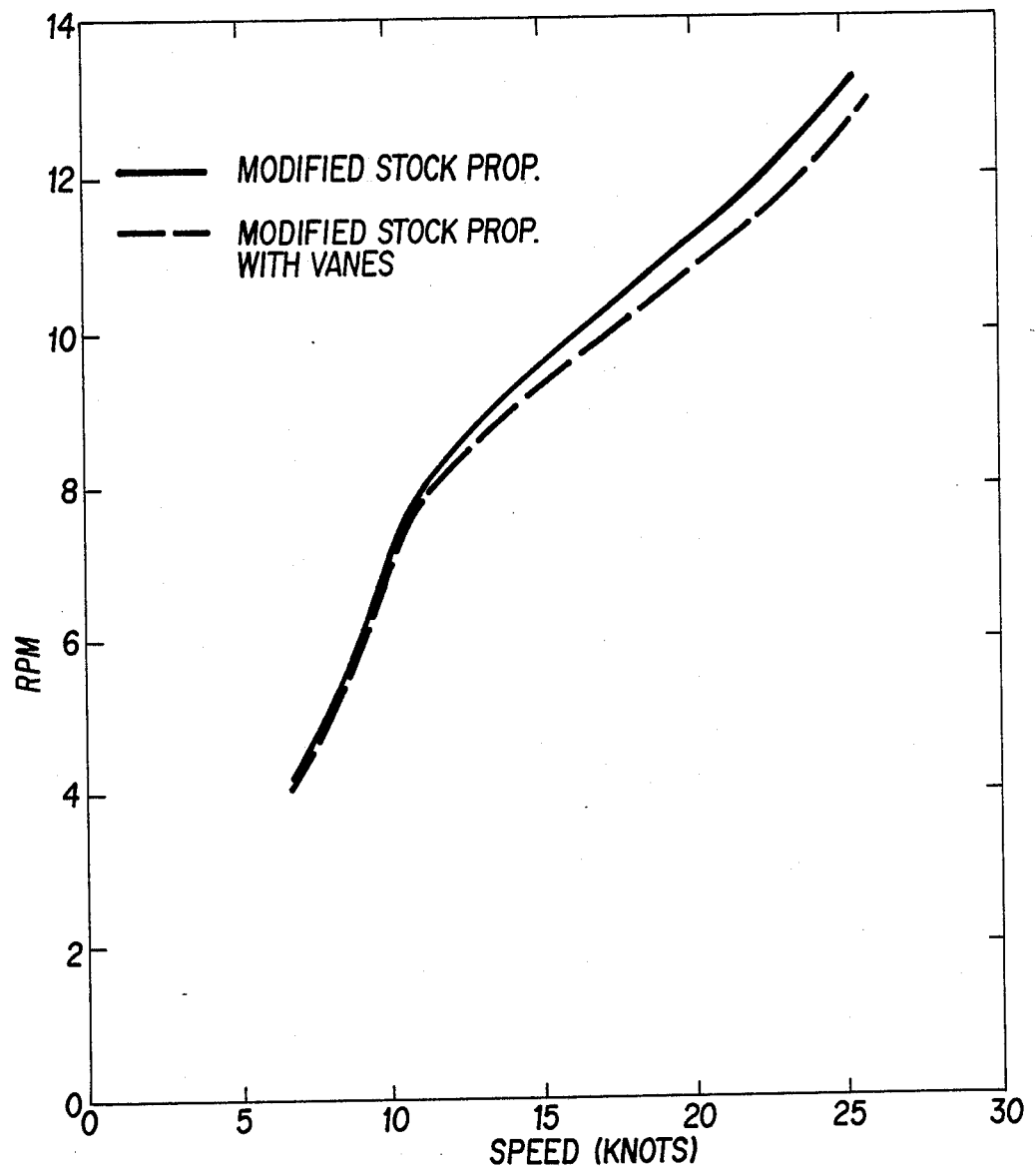
FIG. 1 shows the reductions in propeller RPM for any given speed after the vane-propeller system of the present invention is installed.
Figure 2:
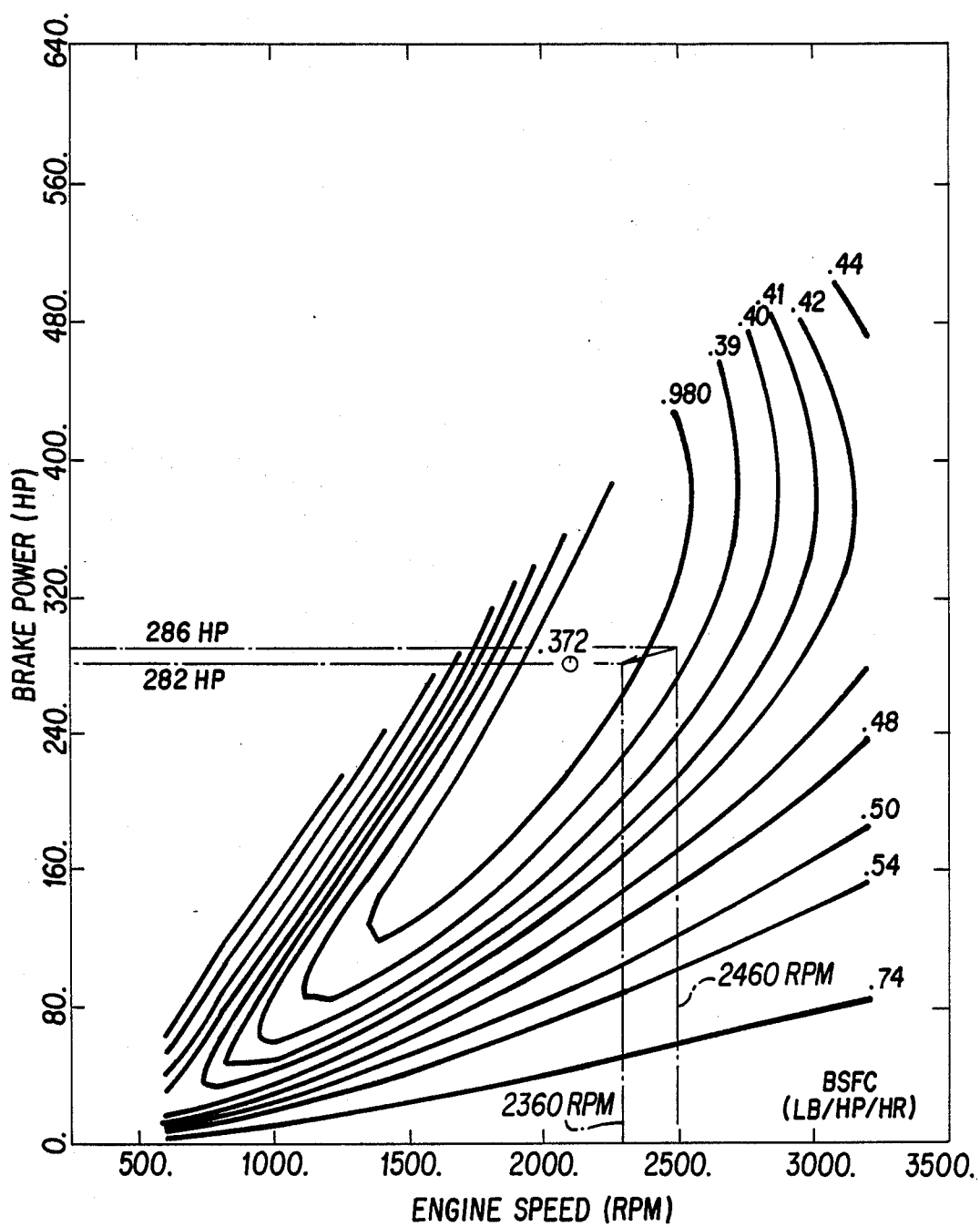
FIG. 2 shows how a change in engine RPM causes reductions in fuel consumption rates on a diesel engine fuel map.

For a given craft speed a reduction in propeller RPM occurs when compared to the same craft without the vane-propeller combination, FIG. 1. Since frictional energy losses on the propeller blades (due to the viscosity of the water) are proportional to the square of the propeller RPM, a significant increase in propeller efficiency will occur. In addition, for the typical diesel engine a reduction in RPM for a given craft speed results in a reduction in the fuel consumption rate of the engine. FIG. 2 shows this phenomenon which occurred on the test craft. The savings in fuel from this effect amounted to approximately 2% of the total fuel savings. This is in addition to the savings realized from a reduction in shaft horsepower required for a given speed.

Figure 3A:
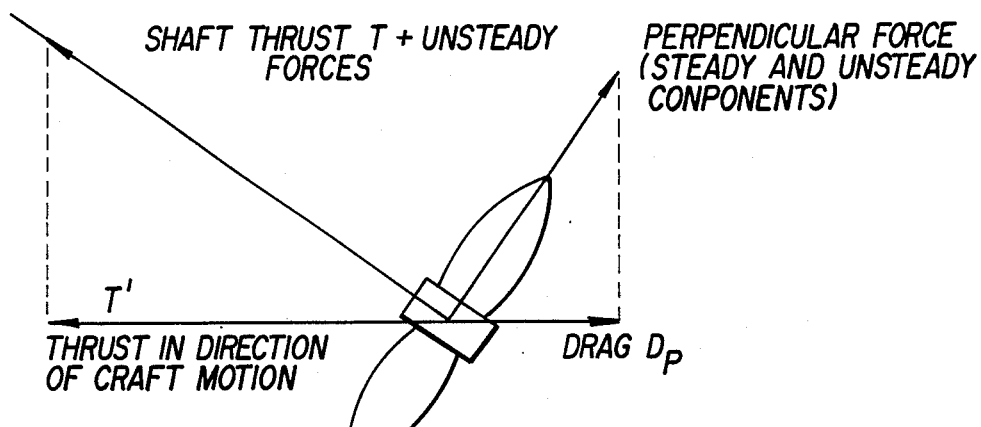
FIG. 3 shows the forces acting perpendicular to the propeller.
Figure 3B:
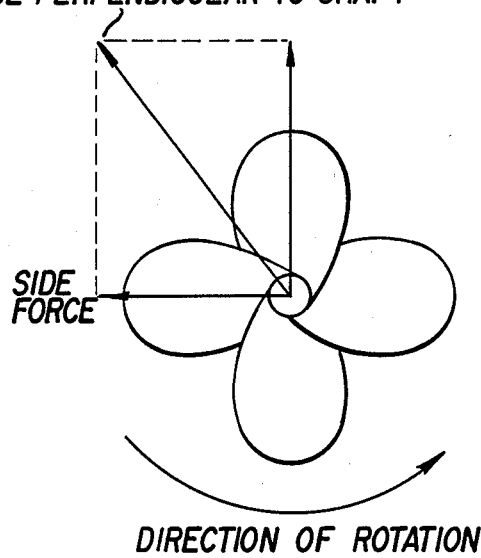

For single propeller vessels with inclined shafts but without vanes a force which has steady and unsteady components, see FIGS. 3A and 3B, acts perpendicular to the shaft. The horizontal component of the steady force acts to turn the vessel. This turning has to be counteracted by use of the rudder and a loss of energy occurs due to the increase in drag caused by the rudder deflection. When properly matched vanes are added, the side force from the propeller is offset by the side force from the vanes shown in FIG. 7B. The side force from the vanes also partially or completely offsets the torque of the propeller in a single propeller vessel.

Due to inclination of the propeller shaft one side of the propeller disc (without vanes present), the side where the propeller is on the upward part of its rotation, is lightly loaded while the other side is heavily loaded. As a single propulsor unit the asymmetric pre-swirl vane-propeller combination can be designed for a more uniform loading of the propeller disc. This results in a further reduction in axial kinetic energy losses in the propulsor slipstream. By reducing the load on the heavily loaded side of the propeller disc, blade back cavitation is reduced or eliminated. Further, on the lightly loaded side of the propeller disc, face cavitation may occur. By loading up this side of the disc with the vanes, blade face cavitation will be eliminated.

Due to the uneven loading on prior art propeller discs without vanes, vibrations resulting from unsteady forces which are perpendicular to the shaft (inclined shafts only) and parallel to the shaft occur. These vibrations are transmitted up the shaft to the reduction gear or engine and are also transmitted through the shaft bearing directly to the hull. By using a properly designed asymmetric pre-swirl vane and matched propeller the unsteady forces caused by the propeller can be minimized or eliminated. This results in reduced hull-borne vibrations, a quieter vessel, increased propeller shaft bearing life, and reduced maintenance on reduction gears and engines.

Pre-swirl vanes also act as a guard for the propeller. Any loss in efficiency caused by the vanes is offset by the increased efficiency of a properly designed propulsor unit. The guard can prevent debris from hitting the propeller while in operation or prevent injury to humans while boarding or swimming in the vicinity of a turning propeller.

A propeller on an inclined shaft produces a force which is perpendicular to the shaft. A component of this force acts as a drag on the craft in the direction of craft travel as shown in FIG. 3A. The use of the asymmetric pre-swirl vane and matched propeller minimizes or eliminates this drag caused by the propeller.

When properly designed the asymmetric pre-swirl vane and matched propeller combination can have a smaller diameter propeller compared to the prior art optimum propeller diameter without vanes. This allows more clearance between hull and propeller, and reduces the vessel's draft.

Figure 9:
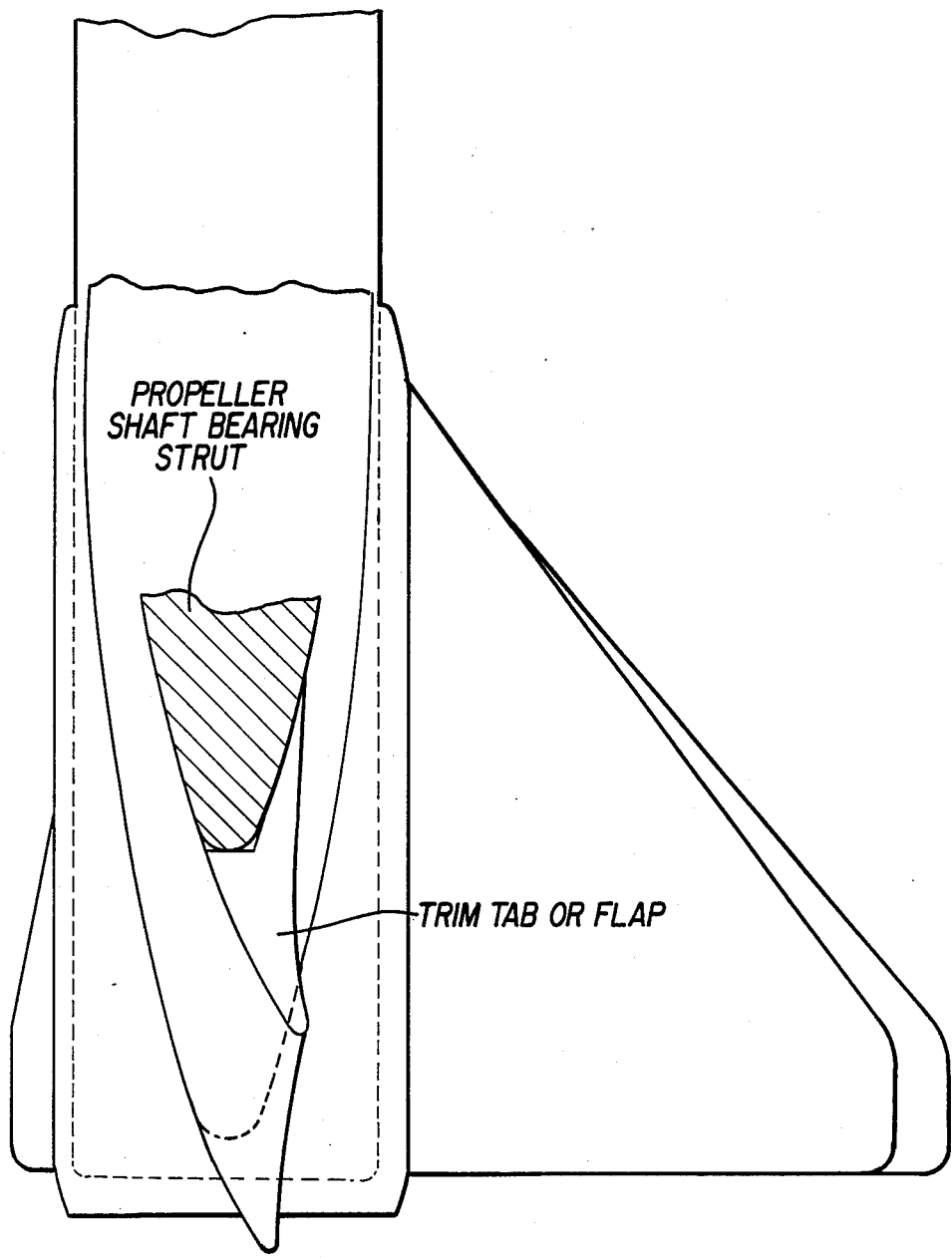
FIG. 9 is a side view of a vane as designed for the 41 foot boat.
Figure 14:
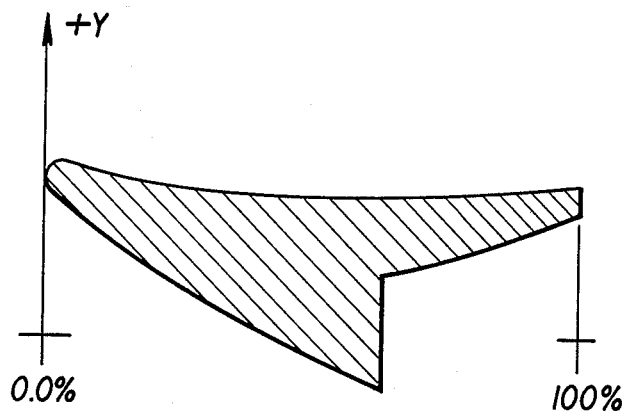
FIG. 14 shows the coordinates for the trim tab or flap.

FIG. 9 is a view looking down from the top of the propeller bearing strut. The trim tab shown attached to the strut acts similarly to a flap on an airplane wing. This tab or flap generates a circulation around the bearing strut, creating a horizontal force on the strut. Therefore, the strut and trim tab generate tangential velocities or swirl opposite to the rotation of the propeller, and are considered an integral part of the propulsor design. FIG. 9 shows that each vane is shark-fin in outline; this is for the purpose of shedding debris from the vanes and propellers, since debris is a common problem in the waters where these boats operate. However, it was found in later testing that this shape (i.e. a truncated right triangle extending to the edge of the propeller disc and attached to the vessel along one of its perpendicular sides) provides the benefits of properly directly the flow into the propeller without causing cavitation damage to the blades of the propeller as in prior art vanes. This is because the spanwise taper of the vanes prevents the vortices at the tips of the vanes from becoming strong enough to damage the tips of the propeller blades when the vortices impinge on them. The prior art vanes, which did not have this tapered shape, generated strong vortices at their tips with consequent severe cavitation damage to the tips of the propeller blades. The chord length of the vanes at r/R (R is the tip radius of the vane, r is local radius)=0.25 is 10.3 inches and is linearly tapered to 2.13 inches at r/R=0.96. The vane offsets, including upper (suction side) and lower (pressure side) vane thickness coordinates, pitch distribution, and chord lengths at four non-dimensional radii, are given in Table I for vanes 1 and 2 (see FIG. 5a) and in Table II for vanes 3 and 4. These offsets are for the vanes for the port propeller; the vanes for the starboard propeller are mirror images of these vanes, assuming that the propellers are counterrotating. FIG. 14 gives the offsets for the strut trim tab or flap. As can be seen from Tables I and II the shapes of the vanes are different. This is because each vane is in a different flow field and must be designed to meet its own particular flow conditions.

Figure 10:
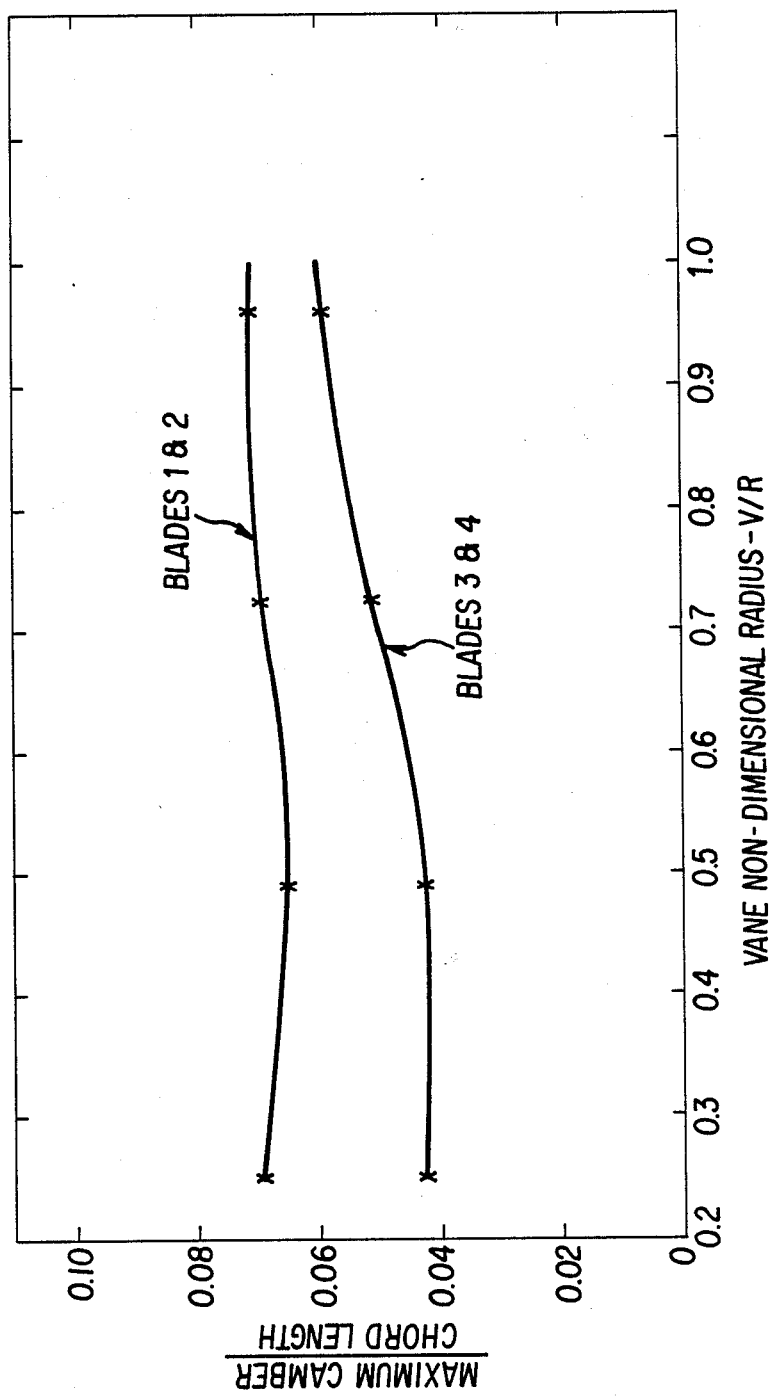
FIG. 10 shows the maximum camber of the vanes.

The camber distribution of the vanes is approximately that of an NACA 65 airfoil mean line, and the spanwise distribution of maximum camber is shown in FIG. 10. Note that vanes 1 and 2 have a slight reduction in pitch near their tips while vanes 3 and 4 do not. This reduction in pitch unloads the vane tips on these two highly loaded vanes. The nose-tail line of the root sections of vanes 1 and 2 is set at a 2 degree angle relative to the centerline of the shaft and that of vanes 3 and 4 is set at 5 degrees relative to the centerline of the shaft. The section angle of attack of a vane section relative to the inflow at any radius is determined approximately by the following formula:

$$\alpha = \xi - \phi \sin\theta \quad (2)$$

where
- $\alpha$ = section angle of attack
- $\xi$ = angle of vane root section with respect to the shaft centerline φ = angle of shaft with respect to the craft's bottom or buttock lines θ = angular position of the vane with respect to the bearing strut; 0 degrees is at the strut, and 90 degrees is at the 9 o'clock position looking forward from behind the propeller.

When the section camber is included with the section angle of attack given by equation (2) to determine loading, it can be seen that each vane is loaded differently. Vanes 1 and 2 have the greatest loading, with a slightly reduced amount on vane 3. The lightest loadings occur on the strut trim tab and on blade 4. This results in very large, local tangential velocities being induced at and downstream of the propeller by the vanes.

This asymmetric tangential velocity field is what is responsible for the stated improvements in propulsive efficiency. The rotational velocity field or tangential velocity field induced by the propeller in its slipstream is partially cancelled out by the counter-rotation of fluid induced by the vanes. This produces a portion of the stated energy savings. A naturally occurring partial cancellation of the swirl velocities induced by the propeller in its slipstream results from the superposition of vector V3 (FIG. 5) onto the side of the slipstream not covered by the vanes.

The distance from the vane hub to the vane tip is 10 inches, which is approximately 77 percent of the propeller radius (the propeller radius is 13 inches). As stated earlier, the vanes are mounted on the shaft bearing housing immediately ahead of the propeller.

Figure 11:
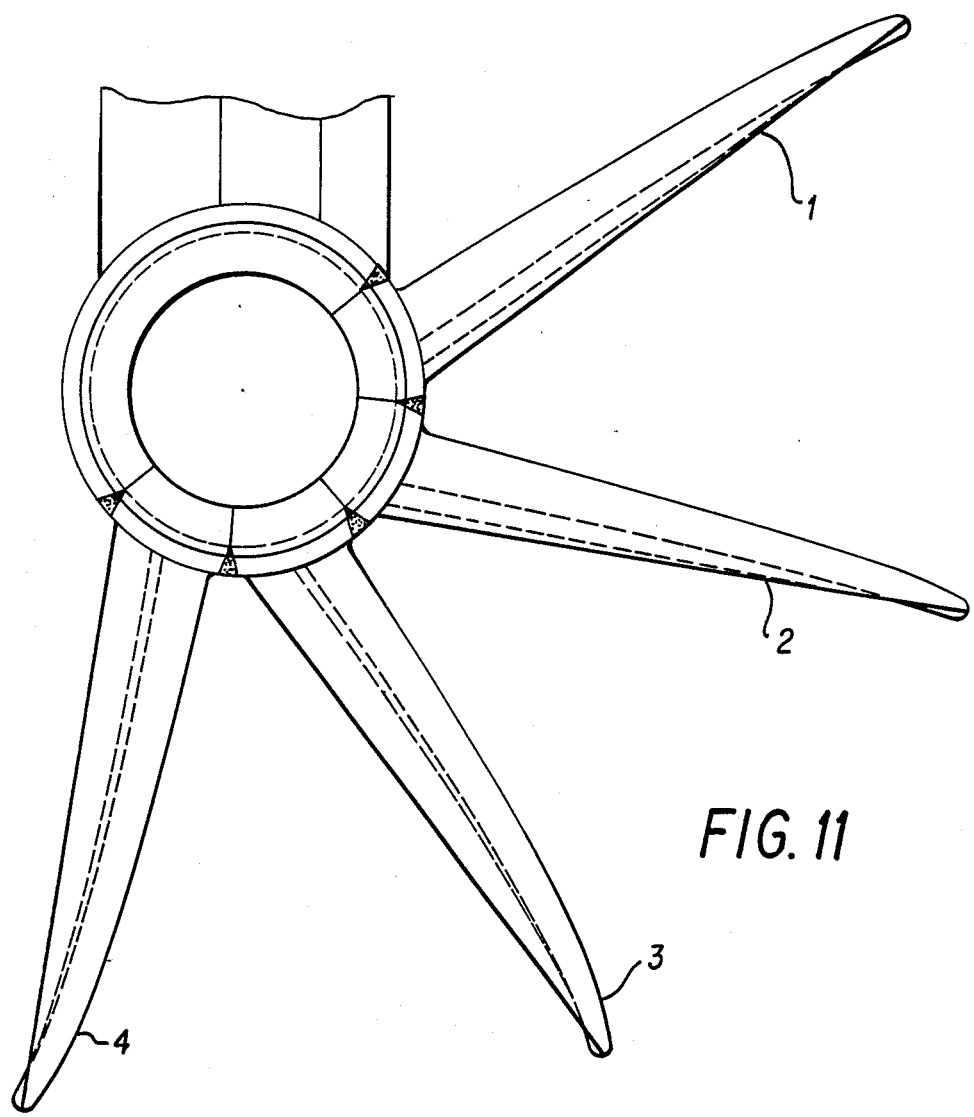
FIG. 11 shows an end view of the vanes.

FIG. 11, which is a view along the centerline of the propeller shaft, shows the vanes skewed counterclockwise with respect to a radial line intersecting the midpoint of the vane root. This skew was necessary due to the method of vane construction. On future designs this skew may or may not be necessary, depending on construction methods. FIG. 12 is a view of the vanes from underneath the test craft looking toward the stern and shows the vane-propeller combination as seen by the incoming water flow. Vanes 16 are primarily on that part of the propeller disc where the blades are on the upward port of their rotation, since this is the part of the disc where the blades are lightly loaded due to the inclination of the propeller shaft.

The propeller initially used on the test craft was an off-the-shelf, flat faced, optimum constant pitch propeller manufactured by Columbian Bronze Corp. An identical propeller, except of lower original pitch, was later mechanically repitched to match the perturbation velocity field generated by the vanes. The characteristics of this re-pitched propeller are shown in Tables IV and V. The ability to use modified commercially available propeller with the vanes is important since it considerably reduces the installation cost of the asymmetric pre-swirl vanes and matched propeller set. Physical constraints prevent an exact match of the propeller to the vanes when mechanically repitching; however, where maximum performance or efficiency is the primary consideration a specially designed and manufactured propeller can be used. Initial cost, however, will increase sharply.

TABLE IV

| Modified Propeller Specifications | |
|---|---|
| Diameter | 26.0 inches |
| Pitch and Chord lengths | See Table V |
| Hub length | 6.0 inches |
| Blade thickness distribution | Same as the 26" × 28" TETRADYNE* series propellers |
| Blade skew angle distribution | Same as the 26" × 28" TETRADYNE* series propellers |
| Blade rake | Same as the 26" × 28" TETRADYNE* series propellers |
| Number of propeller blades | Four |
| Shaft diameter | 2.0 inches |
| Shaft taper | Standard SAE J755 taper |
| Material | Ni-BRAL, ABS grade 4 |

*Manufactured by Columbian Bronze Corp.

TABLE V

| Pitch and Chord Distributions of Modified Propeller | | |
|---|---|---|
| r/R | Pitch (inches) | Chord (inches) |
| 0.30 | 24.80 | 5.99 |
| 0.40 | 25.45 | 7.54 |
| 0.5. | 26.02 | 8.89 |
| 0.60 | 26.57 | 9.88 |
| 0.70 | 27.30 | 10.39 |
| 0.80 | 28.29 | 9.96 |
| 0.90 | 29.49 | 7.87 |
| 0.95 | 30.52 | 5.65 |

Two methods of designing the vanes and propeller system presently exist. The first method is by modified momentum theory and the second is by lifting line and lifting surface theory. The latter is the preferred method since local velocities and pressures can be predicted. Using this method, perturbation velocities from the vanes are calculated at and downstream of the propeller disc. In turn, perturbation velocities which arise from the propeller are calculated at the vane location. This process is repeated until convergence occurs. The final calculated perturbation velocities along with the design requirements dictate vane and propeller geometry.

As with all methods used for propulsor design, model or full scale tests are required. Generally, small changes in propulsor geometry will be required after the first series of tests. Therefore, the vane and propeller system of the present invention is designed to be as close to the optimum geometry as the present state of the art permits, followed by model or full scale tests, and possibly small geometry changes.

It was also discovered that the vanes and the modified propeller functioned well independently of each other. When the asymmetric pre-swirl vanes were located ahead of the stock or original propeller (26 inch diameter, 28 inch optimum constant pitch "Tetradyne" propeller) on the test craft, reductions in shaft horsepower of up to 6 percent were recorded. More significantly, reductions in fuel consumption of up to 15 percent were recorded at speeds of 10 knots; however, as speed increased to 23 knots the fuel savings vanished. Other benefits similar to those resulting from the use of the vanes and matched propeller were also realized, but to a significantly lesser degree. The high reduction in fuel consumption at lower speeds, using the original propeller and an add-on set of asymmetric vanes, could be very important on craft which operate at low speeds for long periods of time, such as work boats and trawlers.

The modified stock propeller used with the vanes also performed extremely well without the vanes on the inclined shaft. The use of this propeller alone resulted in significant reductions in shaft horsepower and fuel consumption over the speed range of the craft. It is believed that the loading up of the highly pitched blade tips, and the unloading of the root sections, are responsible for the performance gains. The current state of the art in propeller design, where no viscous wake is assumed to exist, dictates that a constant pitch propeller be used in this application for maximum efficiency. After reviewing test data for this propeller alone, it is believed that two phenomena occurred: (1) Unsteady forces related to the once-per-revolution variation in blade section angle of attack, which is greatest at the inner radii of the propeller, are reduced when the pitch—hence load—at the inner radii is reduced, thereby causing a reduction in energy losses related to these unsteady forces. (2) At the outer propeller radii, the once-per-revolution variation in blade section angle of attack becomes minimal; therefore, loading up the blade tips causes thrust to be delivered in a more uniform manner over the annulus swept out by the outer portion of the tips, and this in turn minimizes axial and rotational kinetic energy losses in the slipstream of the propeller.

The performance of the modified propeller on an inclined shaft cannot be predicted with current analytical or empirical means. However, it is believed that if one selects a constant pitch, flat faced propeller for optimum performance, based on noninclined shaft analysis, the performance of this propeller can be increased using the following guidelines: (1) select a blade root pitch which is 10 percent less than the optimum constant pitch propeller. (2) select a blade tip ($r/R=0.95$) pitch that is 10 percent greater than the constant pitch propeller. (3) select a blade section pitch at $r/R=0.7$ equal to the pitch of the optimum constant pitch propeller.

When a curve is fitted to these three points on a graph of $r/R$ versus pitch, a non-linear pitch distribution is shown. The resulting modified propeller will be identical to the optimum constant pitch propeller in all geometry details except for the non-linear pitch distribution.

In the case of the test craft, a 26 inch diameter by 28 inch constant pitch Columbian Bronze Corp. "Tetradyne" propeller was found to be optimum using standard empirical charts. A second 26 inch diameter "Tetradyne" propeller was purchased with a 25 inch constant pitch. This second propeller was then mechanically repitched to 28 inches at $r/R=0.7$ and to 31 inches at $r/R=0.95$. This is the propeller which was matched to the asymmetric pre-swirl vanes, and which also performed exceptionally well with no vanes ahead of it.

Figure 13:
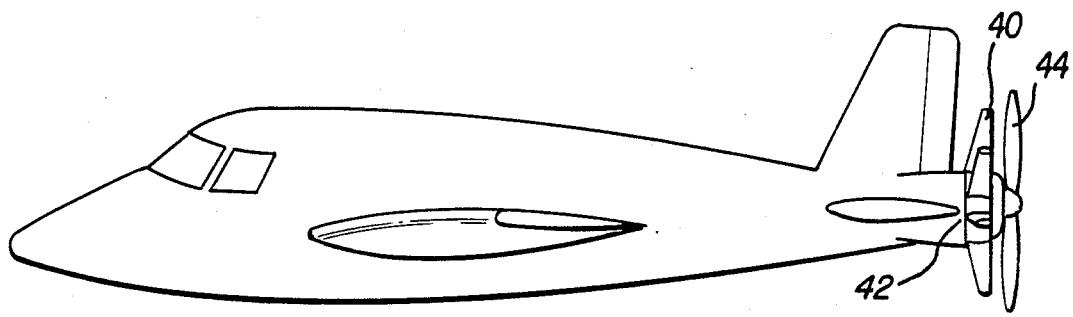
FIG. 13 shows the application of the principles of the present invention to an airplane propeller.

Since air and water are both fluids and the present invention is an application of fluid mechanics, it is obvious that the principles of the present invention can be applied to an airplane propeller to improve its operating efficiency when the propeller is not absolutely vertical. For example, a propeller on a pusher type configuration could probably benefit from the application of the principles of the present invention to its operation. As shown in FIG. 13, vanes 40 of the present invention would be mounted on the exterior of engine casing 42 on the side where propeller 44 is on the upward part of its rotation, thereby giving propeller 44 a positive angle of attack on that side of its disc. As with a boat, the size and angular orientation of the vanes for an airplane propeller will be dictated by the flow at the propeller.

What is claimed is:

1. The method of improving the efficiency of a marine propeller mounted on an inclined shaft which comprises: directing the flow of water downward into said propeller to offset the effects of inclination of said shaft by means of vanes mounted upstream of said propeller primarily on the part of the propeller disc where the propeller is on the upward part of its rotation, said vanes being truncated right triangles in plan view extending to the edge of the propeller disc and attached to said vessel along one of their perpendicular sides.

2. The method of reducing cavitation in a propeller mounted on an inclined propeller shaft which is moving through undisturbed water, said shaft being contained within a propeller shaft housing, which comprises directing the water flowing into the propeller in such a manner as to give the propeller a positive angle of attack with respect to the water over its entire disc by means of vanes mounted upstream of said propeller, said vanes being truncated right triangles in plan view extending to the edge of the propeller disc and attached to said propeller shaft housing along one of their perpendicular sides.

3. The method of claim 2, wherein said vanes are primarily on the side of the propeller disc where the propeller blades are on the upward part of their rotation.

4. The method of claim 3 including directing said water flow downward into the propeller.

* * * * *